United States Patent [19]

Habicht

[11] Patent Number: 5,509,698
[45] Date of Patent: Apr. 23, 1996

[54] AXIALLY EXTENDIBLE CONDUIT

[76] Inventor: Helmut Habicht, 15 Royal Park Ter., Hillsdale, N.J. 07642

[21] Appl. No.: 398,113

[22] Filed: Mar. 3, 1995

[51] Int. Cl.⁶ .................................................. F16L 27/107
[52] U.S. Cl. .............................. 285/302; 285/9.2; 285/31; 285/101; 285/111
[58] Field of Search ............................ 285/9.2, 19, 20, 285/31, 170, 298, 299, 300, 301, 302, 920, 101, 111

[56] References Cited

U.S. PATENT DOCUMENTS

| 3,427,051 | 2/1969 | White et al. | 285/302 |
| 3,473,828 | 10/1969 | Pearson | 285/9.2 |
| 3,490,792 | 1/1970 | Piegza | 285/299 X |
| 3,713,623 | 1/1973 | Pearson | 285/9.2 X |

FOREIGN PATENT DOCUMENTS

| 223344 | 5/1958 | Australia | 285/920 |
| 71027 | 1/1970 | Germany | 285/302 |
| 1770660 | 10/1992 | U.S.S.R. | 285/302 |

Primary Examiner—Dave W. Arola
Attorney, Agent, or Firm—Patrick J. Pinto

[57] ABSTRACT

An axially extendible conduit that includes an elastic conduit member and an actuator means. The elastic conduit member extends from a first terminal end to a second terminal end. The actuator means encircles the elastic conduit member. The first terminal end of the elastic conduit member is attached to a fixed end of the actuator means. The second terminal end of the elastic conduit member is attached to a ring member of the actuator means. The first terminal end of the elastic conduit member includes an integral gasket or sealing surface for providing a dustless seal with an abutting apparatus. The second terminal end includes an integral seal means for providing a dustless seal with an abutting receptacle. Selective actuation of the actuator means moves the ring member from a retracted position to an extended position. The actuator means may be a single acting or a double acting type of linear actuator. The inside diameter of the elastic conduit member may be uniform or tapered. The inside diameter of the elastic conduit member further provides a continuous smooth surface for material to flow through.

18 Claims, 2 Drawing Sheets

5,509,698

AXIALLY EXTENDIBLE CONDUIT

BACKGROUND OF THE INVENTION

1. Field of the Invention

With regard to the classification of art, this invention is believed to be found in the general class entitled Fluent Material Handling and more particularly to those subclasses pertaining to Axially Extendible Conduits.

2. Description of Related Art

Axially extendible conduits are known in the art. Some examples of the known art are: Bellows, Telescopically Connected Conduits, or the like. With regard to fluent material handling, the known prior art have deficiencies. The known prior art do not provide a smooth interior surface for the passage of fluent materials therethrough. The known prior are not easily adapted to automated filling applications. Many automated filling applications often require that the handling of granular materials be substantially dustless. This dustless requirement is needed to meet safety and/or environmental regulations. Accuracy of the fill and the loss of product is also important factor in the cost of making products. It is also desirable for an axially extendible conduit to accommodate differences in the height of a receiving container. It is very important in industries that produce food, pharmaceuticals and the like, that the equipment be easily disassembled for cleaning. The present invention solves all of these requirements.

SUMMARY OF THE INVENTION

The present invention may be summarized at least in part with respect to its objectives. It is an object of this invention to provide and it does provide an axially extendible conduit that provides a smooth interior surface.

It is another object of the invention to provide and it does provide an axially extendible conduit which is easily disassembled for cleaning and sanitizing.

It is still another object of this invention to provide and it does provide an axially extendible conduit that is selectively powered between a retracted condition to an extended condition.

In brief the present invention provides an axially extendible conduit comprising an elastic conduit member and an actuator means. The elastic conduit member has a first terminal end, and a second terminal end. The elastic conduit member further includes a predetermined inside diameter and outside diameter. The actuator means encircles the elastic conduit member. The actuator means is further adapted for selective actuation, for moving a ring member of the actuator means between a retracted position and an extended position. The first terminal end of the elastic conduit member is attached to a fixed portion of the actuator means. The second terminal portion of the elastic conduit member is attached to the ring member. The elastic conduit member is urged to an axially extended condition by the selective actuation of the actuator means. Each of the terminal portions of the elastic conduit member may include integral gasket or sealing surfaces for providing a substantially dustless connection with abutting equipment.

In one of the embodiments, the actuator means is a single acting linear actuator which includes a biasing means. The biasing means returns the linear actuator to a retracted condition. The biasing means may be provided by the elasticity of the elastic conduit member alone or in combination with a plurality of biasing members.

In another embodiment, the actuator means include a double acting linear actuator that provides a powered retraction or extension of the conduit. In all of the embodiments, the inside diameter of elastic conduit member may be uniform or tapered.

In addition to the above summary, the following disclosure is intended to be detailed to insure adequacy and aid in the understanding of the invention. However, this disclosure, showing particular embodiments of the invention, is not intended to describe each new inventive concept which may arise. These specific embodiments have been chosen to show at least one preferred or best mode for an axially extendible conduit of the present invention. These specific embodiments, as shown in the accompanying drawings, may also include diagrammatic symbols for the purpose of illustration and understanding.

Figure 2:
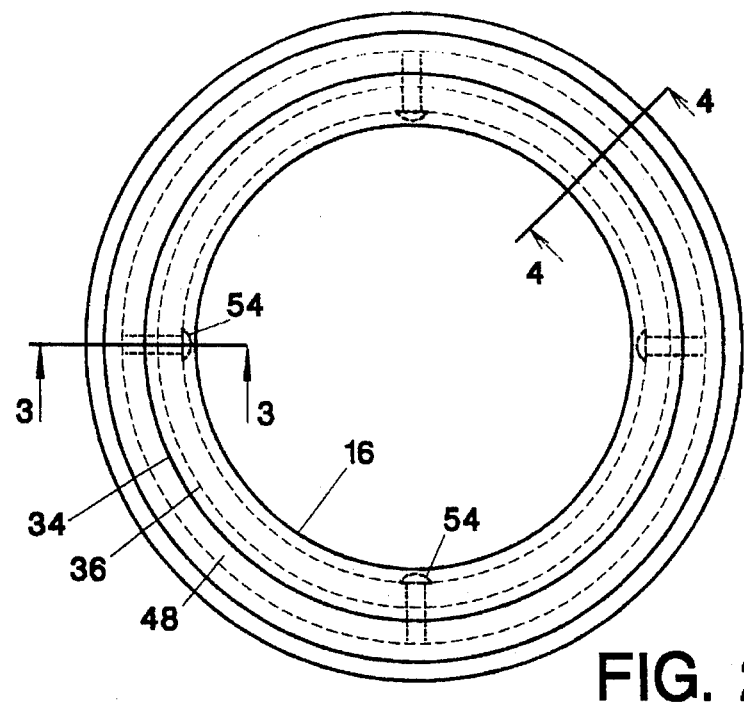
FIG. 2 represents a plan view of the present invention.

In the following description and in the appended claims, various details are identified by specific names for convenience. These names are intended to be generic in their application while differentiating between the various details. The corresponding reference numbers refer to like members throughout the several figures of the drawing.

The drawing accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Figure 1:
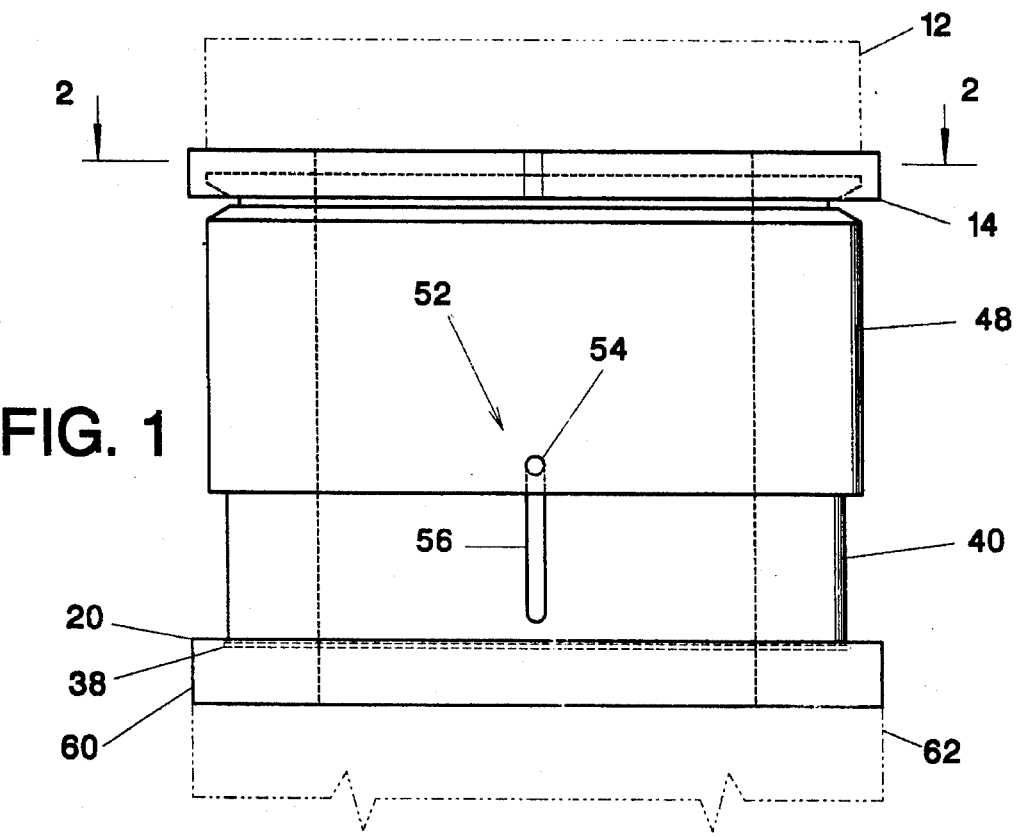
FIG. 1 represents a front elevation of a first embodiment of an axially extendible conduit of the present invention This view depicting the present invention in an extended condition.

Referring first to FIG. 1, an axially extendible conduit assembly, is generally identified as 10. This conduit assembly 10 is removably attached to a valve assembly 12 by means of a quick connecting clamp 14. The valve assembly 12 is depicted in dashed outline. A typical preferred valve assembly and clamp arrangement is shown in U.S. Pat. No. 5,236,003. U.S. Pat. No. 5,236,003 issued to the present inventor on Aug. 17, 1993 and is incorporated by reference to the extent that the present law allows. Alternatively the conduit assembly 10 may be flange mounted to an abutting flange of a valve assembly, which has not been shown. It is preferred that the quick connecting clamp 14 or other quick release arrangement be employed for ease of removing the conduit assembly 10 for cleaning, maintenance, or repair. A spare conduit assembly can be quickly and easily placed into service as a substitute during any cleaning, maintenance, or repair.

Figure 3:
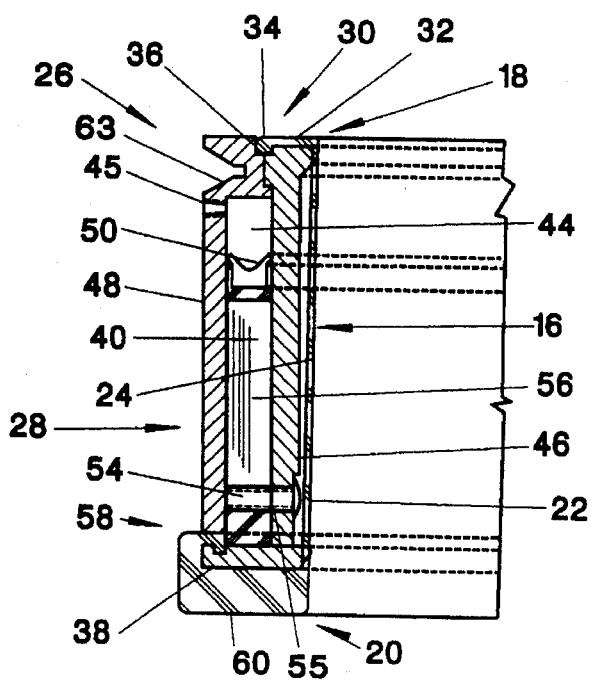
FIG. 3 represents a fragmentary sectional view of the first embodiment, this view being taken along line 3—3 of FIG. 2. This view depicting the present invention in a retracted condition.
Figure 4:
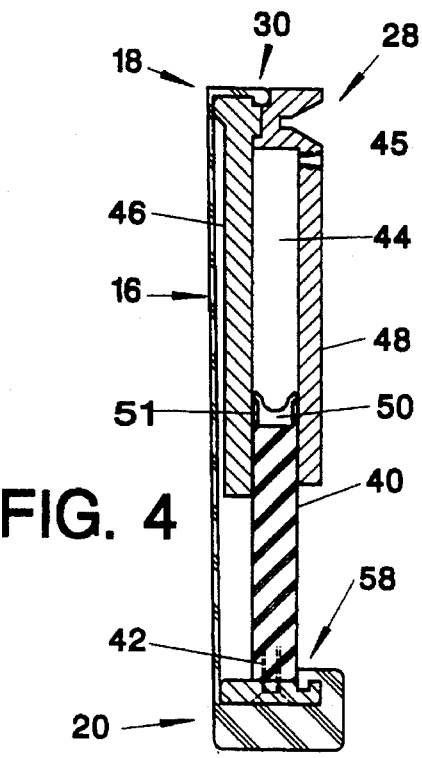
FIG. 4 represents a fragmentary sectional view of the first embodiment, this view being taken along line 4—4 of FIG. 2. This view depicting the present invention in an extended condition.

Referring now to FIGS. 2, 3 and 4, the conduit assembly 10 includes an elastic conduit member 16. This elastic conduit member 16 includes a first terminal end 18, a second terminal end 20, an inside diameter 22 and an outside diameter 24. The first terminal end 18 of the elastic conduit member 16 is removably retained to a fixed portion 26 of an actuator means 28. It is preferred that the actuator means 28 be of the expanding chamber type, such a pneumatic or hydraulic cylinder. It is anticipated that the actuator means 28 may be electro-magnetically operated for relatively short axial movements. The first terminal end 18 is preferably configured for being removably attached to that fixed portion 26. It is also preferred that the fixed terminal end 18 be formed to include a integral gasket means 30. One type of gasket means 30 would take the form of a flange portion 32 with a substantially circular bead 34. The bead 34 preferably is sized and shaped to lock into a groove 36 that is formed into the fixed portion 26 of the actuator means 28. The integral gasket means 30 would form a substantially dustless seal between the conduit assembly 10 and an abutting valve 12. This gasket means 30 would be effective with a either the quick connecting clamp means 14 or the flange connection, that have been discussed above.

The second terminal end 20 is attached to a ring member 38 of the actuator means 28. Preferably the second terminal end 20 is removably attached to the ring member 38. The ring member 38 is removably attached to a tubular piston 40 by means of a plurality of threaded fasteners 42. Each threaded fastener 42 preferably is a flat head screw that is seated in a counter sunk aperture, as seen in FIG. 4.

Referring in particular to FIGS. 3 and 4, the tubular piston 40 is slideable in a tubular chamber 44. The tubular chamber 44, that is formed by an inner tubular member 46 and an outer tubular member 48, has one open end. A fluid port 45 is provided at or near the closed end of the chamber 44. The inner tubular member 46 and outer tubular member 48 are locked in a fixed relationship. The tubular piston 40 includes a sealing means 50. One example of sealing means 50 includes a U-cup seal that is seated and held in a seat 51 that is formed in a face of the tubular piston 40. Other types of seals may be used, such as O-Rings, U-cups, Quad rings and the like that are seated in grooves. These grooves would be formed into the perimeter of the inside diameter and outside diameter of the tubular piston 40.

Referring again to FIGS. 1 and 3, The actuator means includes at least one stop means 52 for limiting the stroke of the tubular piston 40, within the chamber 44. One example of a stop means 52 includes a threaded fastener 54 that is seated in a threaded aperture 55 that is formed in the inner tubular member 46. An elongated aperture 56 of a predetermined length is formed at a predetermined location in the tubular piston 40. This elongated aperture 56 must be in alignment with the threaded fastener 54. Alternatively, the threaded fastener 54 may be screwed into the outer tubular member 48.

Figure 5:
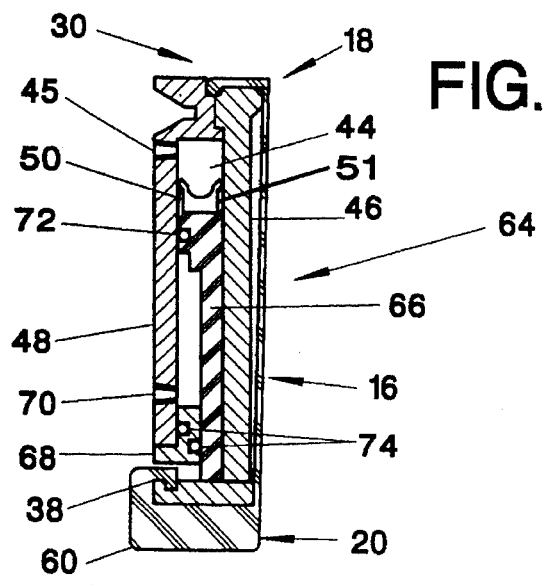
FIG. 5 represents a fragmentary sectional view of a first alternate embodiment of the present invention, this view being taken in the same direction as FIG. 3.

Referring in particular to FIG. 3, 4, and 5, the second terminal end 20, preferably, is configured to include a engaging means 58. The engaging means 58 further includes an integral gasket seal 60. This gasket seal 60 should be adapted for engaging the mouth of a receiving receptacle 62. The receiving receptacle 62 is depicted in dashed outline in FIG. 1. This gasket seal 60 should be contoured to provide a substantially dustless seal with the receiving receptacle 62.

Still referring to FIGS. 3, 4, and 5, the valve attaching end of the outer tubular member 48 preferably is configured for receiving and mating with a quick connect clamp 14. The tapered configuration 63, as depicted in the drawing, mates with the quick connect clamp 14 and draws the abutting parts together in a sealed relationship.

In the previous description associated with FIGS. 3 and 4, the actuator means 28 has been depicted as a single acting type. In this example, the elastic conduit means also acts as a biasing means, for maintaining the conduit assembly 10 in a retracted condition. As and when a compressed fluid is selectively introduced into the port 45, the elastic conduit member 16 is urged to an extended condition by the piston 40.

Alternatively, a double acting actuator means 64 may be used. This double acting actuator 64 is depicted in FIG. 5. This double acting actuator 64 includes: a tubular piston 66 that is shouldered, an outer tubular member 48, an inner tubular member 46, and an end cap 68. In this example, the end cap 68 is removably attached to the outer tubular member by means of a plurality of threaded fasteners, not shown. The end cap 68 includes: a sealing means 74. The actuator means further includes a port 70 which is in fluid communication with the lower portion of the chamber 44. The port 45 is in fluid communication with the upper portion of the chamber 44. In this example the stroke of the piston 66 is limited by the upper and lower extent of the chamber 44. The piston 66 is removably attached to the ring member 38 in a manner previously described. The ring member 38 is attached to the elastic conduit member 16 in the manner also previously described. The piston 66 includes two sealing means 50 and 72. The sealing means 50 has been previously described in conjunction with other embodiments of the invention. The sealing means 72 may include at least one of the following: an O-ring, A Quad ring, a U-cup or the like that are seated in a peripheral groove, that is formed in the outside diameter of the tubular piston 66..

When the present invention is used in the food or pharmaceutical industries, the preferred material for the inner tubular member 46, outer tubular member 48 and the ring 38 is stainless steel. The piston 40 or 66 may be made of a FDA grade structural plastic. The Conduit 16 should be made of a FDA grade elastomer such as a food grade urethane. Preferably the inside diameter 22 at the first terminal end 18 is smaller then the inside diameter 22 of the second terminal end 20. It can be seen that any material flowing from the first terminal end 18 to the second terminal end 20 is only exposed to a substantially smooth continuous surface. The smooth continuous inside diameter 22 is present at any axial extension of the elastic conduit member 16. It is preferred that the outward taper be in the direction of material flow, but not limited thereto.

Figure 6:
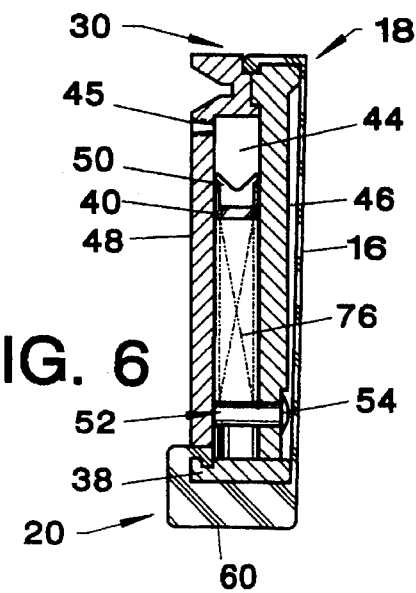
FIG. 6 represents a fragmentary sectional view of a second alternate embodiment of the present invention, this view being taken in the same direction as FIG. 3.

Referring now to FIG. 6, a second alternate embodiment is shown. In this embodiment the piston 40 is urged to a retracted position by means of a plurality of a biasing means 76. Preferably the biasing means 76 are positioned at equal distances around the piston 66 to provide a balanced biasing force. Each biasing means 76 may be a helical compression spring, a urethane compression spring or the like. The biasing means 76 is retained and guided in an open ended elongated aperture 78. One end of the biasing means abuts the piston 66 while the other end abuts a stationary stop means 52 such as threaded fastener 54, a dowel pin, spring pin or the like. It is preferred that the threaded fastener 54 be threaded into the inner tubular member 46 for sanitary reasons. In this preferred arrangement, the head of the fastener is concealed under the elastic conduit member 16. In this preferred arrangement the head of the fastener never comes in contact with product during normal operation.

Alternatively, the exterior of the conduit assembly 10 may include a shroud means, such as a bellows, elastic member or the like for limiting the transfer of unwanted materials into or out of the actuator means 28.

The present invention provides a compact arrangement while generating sealing forces which are sufficient for the intended use. As an example; elastic conduits having inside diameters within the range of 10.16 cm (4 in.) to 30.48 cm (12 in ) will generate respective sealing forces between 8 to 21 times the pressure of a compressed fluid. It is anticipated that displacements of the tubular piston 40 or 66, from a retracted condition to an extended condition, up to 5 cm. (2 in.) should be sufficient to meet the requirements of most applications. It is further anticipated that other displacements may be used, providing that those displacements are within the elastic limits of the elastomer used for the elastic conduit member 16.

Directional terms such as "front", "back", "in", "out", downward, upper, lower and the like are applicable to the embodiments shown and described in conjunction with the drawings. These terms are merely used for the purpose of description in connection with the drawings and do not necessarily apply to the position in which the present invention may be used.

While these particular embodiments of the present invention have been shown and described, it is to be understood that the invention is not limited thereto and protection is sought to the broadest extent that the prior art allows.

What is claimed is:

1. An axially extendible conduit comprising:
   a) an elastic conduit member having a first terminal end, and a second terminal end, the elastic conduit member having a predetermined inside diameter and outside diameter, the elastic conduit member having an interior wall that provides a substantially continuous straight surface from the first terminal end to the second terminal end;
   b) an actuator means that encircles an exterior wall of the elastic conduit member, the actuator means being co-axial with the elastic conduit member, the actuator means being adapted for selective actuation, said selective actuation moving a ring member of the actuator means between a retracted position and an extended position; the first terminal end of the elastic conduit member being attached to a fixed portion of said actuator means; the second terminal portion of the elastic conduit member being attached to the ring member; and
   wherein the elastic conduit member is urged between its retracted position to an axially extended condition by the selective actuation of the actuator means.

2. A axially extendible conduit as recited in claim 1 wherein the actuator means further includes an inner tubular member, an outer tubular member, and a tubular piston member, the inner tubular member and the outer tubular member are held in fixed relationship to each other so that a tubular chamber is formed therebetween, the tubular chamber having one open end, the tubular piston member is slideable in the tubular chamber, the tubular piston member is attached to the ring member, the tubular piston member includes a least one sealing means for providing a fluidic seal between the tubular piston member and walls of the tubular chamber, and the tubular chamber has at least one port for the selective introduction of a compressed fluid therein.

3. An axially extendible conduit as recited in claim 2 which further includes at least one stop means for limiting the extent of movement of the tubular piston with respect to the tubular chamber.

4. An axially extendible conduit as recited in claim 2 wherein the second terminal end includes an integral collar portion for attaching to the ring member.

5. An axially extendible conduit as recited in claim 2 wherein said elastic conduit member is a biasing means for returning the actuator means to the retracted position.

6. An axially extendible conduit as recited in claim 2 wherein said actuator means further includes at least one biasing means, one end of said biasing means abutting the tubular piston member while an other end of the biasing means abuts a stop means, the stop means extending into the tubular chamber.

7. An axially extendible conduit as recited in claim 2 wherein the sealing means is a U-Cup retained in a face portion of the tubular piston.

8. An axially extendible conduit as recited in claim 7 wherein said actuator means further includes an end cap for the tubular chamber, an inside diameter of the end cap includes a seal means for providing a sliding seal with a reduced diameter portion of the tubular piston member.

9. An axially extendible conduit as recited in claim 7 wherein the inside diameter of the elastic conduit member is tapered.

10. An axially extendible conduit as recited in claim 2 wherein one end of the actuator means is adapted for removable attachment to a valve member.

11. An axially extendible conduit a recited in claim 10 wherein said removable attachment includes at least one end of the outer tubular member having a contoured surface for mating with a quick connecting clamping means.

12. An axially extendible conduit as recited in claim 10 wherein the first terminal end includes a first gasket means that is integrally formed thereon, for providing a seal between the actuator means and the valve member.

13. An axially extendible conduit as recited in claim 1 wherein one end of the actuator means is adapted for removable attachment to a valve member.

14. An axially extendible conduit a recited in claim 13 wherein said removable attachment includes at least one end of the actuator means having a contoured surface for mating with a quick connecting clamping means.

15. An axially extendible conduit as recited in claim 13 wherein the first terminal end includes a first gasket means that is integrally formed thereon, for providing a seal between the actuator means and the valve member.

16. An axially extendible conduit as recited in claim 1 wherein the second terminal end includes an integral collar portion for attaching to the ring member.

17. An axially extendible conduit as recited in claim 1 wherein the inside diameter of the elastic conduit member is tapered.

18. A axially extendible conduit as recited in claim 1 wherein the actuator means is a double acting type, said actuator means further includes an inner tubular member, an outer tubular member, and a tubular piston member, the inner tubular member and the outer tubular member are held in fixed relationship to each other so that a tubular chamber is formed therebetween, the tubular piston member is slideable in the tubular chamber, the tubular piston member is attached to the ring member, the tubular piston member includes a least one sealing means for providing a fluidic seal between the tubular piston member and walls of the tubular chamber, and the tubular chamber has two ports for the selective introduction of a compressed fluid therein.

* * * * *